United States Patent [19]
Tignor et al.

[11] Patent Number: 4,982,325
[45] Date of Patent: Jan. 1, 1991

[54] APPLICATIONS PROCESSOR MODULE FOR INTERFACING TO A DATABASE SYSTEM

[75] Inventors: Thomas P. Tignor, Mendham; William H. Toth, Madison, both of N.J.

[73] Assignee: AT&T Bell Laboratories, Murray Hill, N.J.

[21] Appl. No.: 170,210

[22] Filed: Mar. 18, 1988

[51] Int. Cl.⁵ ............................................. G06F 13/00
[52] U.S. Cl. ................................. 364/200; 364/222.2; 364/221.7; 364/228.5; 364/232.7; 364/239; 364/240.8; 364/242.3; 364/284; 364/284.2

[58] Field of Search ... 364/200 MS File, 900 MS File

[56] References Cited

U.S. PATENT DOCUMENTS

| | | | |
|---|---|---|---|
| 4,274,139 | 6/1981 | Hodgkinson et al. | 364/200 |
| 4,321,669 | 3/1982 | Macmillan | 364/200 |
| 4,335,445 | 6/1982 | Nercessian | 364/900 |
| 4,378,588 | 3/1983 | Katzman et al. | 364/200 |
| 4,402,055 | 8/1983 | Lloyd et al. | 364/579 |
| 4,430,699 | 2/1984 | Segarra et al. | 364/200 |
| 4,539,652 | 9/1985 | Rubin | 364/900 |
| 4,584,639 | 4/1986 | Hardy | 364/200 |
| 4,663,704 | 5/1987 | Jones et al. | 364/188 |
| 4,680,788 | 7/1987 | Cordeiro et al. | 379/93 |
| 4,685,124 | 8/1987 | Smitt et al. | 379/95 |
| 4,692,862 | 9/1987 | Cousin et al. | 364/200 |
| 4,714,995 | 12/1987 | Materna et al. | 364/200 |

OTHER PUBLICATIONS

Loughry, "What Makes a Good Interface?", *IEEE Spectrum*, Nov. 1974, pp. 52–57.

Knoblock et al., "Insight into Interfacing", *IEEE Spectrum*, May 1975, pp. 50–57.

EPP Staff, "IEEE 488 Interface for Automated Instrumentation Systems", *Electronic Packaging & Production*, vol. 18, No. 9 Sep. 1978, pp. T19–T22, T24, T26, T28, T30.

Gipe, "IEEE 488:Promise and Practice", *Electronic Packaging & Production*, vol. 18, No. 9 Sep. 1978, pp. T37–T38, T40, T42, T44.

Summers, "IEC Interface Bus (IEEE–488)Simplified", *Electronic Engineering*, vol. 51, No. 632, Dec. 1979, pp. 45, 47, 49, 51, 53, 55.

(List continued on next page.)

*Primary Examiner*—Gareth D. Shaw
*Assistant Examiner*—Paul Kulik
*Attorney, Agent, or Firm*—Eli Weiss

[57] ABSTRACT

The present invention relates to a technique for interfacing a plurality of remote terminals, as, for example, Craft Access Terminals (CATs), directly to a central database in a system, such as, for example, a Craft Access System, without interfacing with an intermediate center such as, for example, a centralized Repair Service Bureau and its personnel. An Applications Processor Microcomputer (APM) module includes a General Data Transport (GDT) to provide a powerful microprocessing environment and multiple data communication interfaces, and an Applications Interface Module (AIM) to provide the appropriate signal interface with the database system, the GDT, and the remote terminals. The APM is arranged for connection on one side to both (1) the database system via a trunk; and (2) one or more remote terminals via separate lines to process their calls and permit direct interaction with the database system; and on a second side a via the GDT to a standard IEEE 488 General Purpose Interface Bus (GPIB) for permitting high-speed communication between a plurality K of such APMs. The APM module is designed to provide both high-speed data and control message transmissions over the GPIB between itself and other corresponding APM modules forming part of a network, which other APMs may not be directly connected to a trunk to the central database system. Additionally, the APM module can have the ability to, (1) determine when a high-speed data or control message has been sent over the GPIB to an APM which is not available; (2) restore a disconnected call; and (3) provide appropriate maintenance and other messages to the various network components during the progress of a call.

5 Claims, 5 Drawing Sheets

OTHER PUBLICATIONS

Young, "Implementing an IEEE-488 Bus Controller with Microprocessor Software", *IEEE Trans. on Industrial Electron. & Control Instrum.*, vol. IECI-27, No. 1, Feb. 1980, pp. 10-15.

Luskow, "Catch the Data Bus-The Economical Way", *Electronic Eng.*, Jan. 1982, pp. 49-50, 52, 54, 57.

Cash et al., "An IEEE 488 Interface Bus Controller", *IEEE Trans. on Indus. Electronic.*, vol. 1E-29, No. 4, Nov. 1982, pp. 308-311.

Skelly et al., "A Broadband Accelerator Control Network", *IEEE Trans. on Nuclear Sci.*, vol. NS-30, No. 4, Aug. 1983, pp. 2155-2157.

Purvis III, "The IEEE-488 Bus: The Interface to the Engineering and Scientific Market", *Buscon '86 West*, Jan. 14-19, 1986, pp. 14-19.

IBM, "GPIB Adapter Circuit for Displaywriter and Personal Computer", *IBM Technical Discl. Bulletin*, vol. 28, No. 11, Apr. 1986, pp. 5143-5145.

Stern, "GPIB-The General Purpose Interface Bus", *Computer Digest*, vol. 3, No. 6, Jun. 1986, pp. 12-14.

Dale, "The Evolution of the Automated Repair Service Bureau with Respect to Loop Testing", *Conf. Rec. Internat. Symposium on Subscriber Loop & Services*, Mar., 1978, Atlanta, GA, pp. 64-68.

*Telephony*, vol. 209, No. 10, Sep. 2, 1985, pp. 44, 48, 50, 53, 124.

*Telephony*, vol. 209, No. 10, AT&T advertisement, pp. 45-46, 1985.

*2nd International Symposium on Subscriber Loops and Services*, May 1976, pp. 39-43.

APPLICATIONS PROCESSOR MODULE FOR INTERFACING TO A DATABASE SYSTEM

TECHNICAL FIELD

The present invention relates to a technique for interfacing a plurality of remote Craft Access Terminals directly to a central database in a Craft Access System.

DESCRIPTION OF THE PRIOR ART

In order to test equipment, such as telephone loops, whether for fault or maintenance purposes, or for statistical information, three basic functions are required, namely: access, test and communication. These three basic functions can readily be identified for any manual or automatic testing system. For instance, within each system, there are mechanisms for gaining control of a piece of equipment to be tested, for connecting to it, and for directing appropriate testing activities. Moreover, a two-way communication path should exist between testing personnel or equipment interfaces so that selected test activities may be initiated, coordinated and the results collected for analysis. Oftentimes, an automated central controller determines the testing pattern and analyzes results via interpretive algorithms.

One such computer-based system has been described in an article by O. B. Dale entitled "The Evolution of the Automated Repair Service Bureau With Respect to Loop Testing", published in the *Conference Record of the International Symposium on Subscriber Loops and Services*, Mar. 20–24, 1978, Atlanta, Ga., at pages 64–68. As described therein, within the Automated Repair Service Bureau (ARSB), there is a convenient method for testing and analyzing test results automatically at the time of a customer contact as well as on demand from Bureau personnel during repair procedures. In this regard see also U.S. Pat. No. 4,539,652 issued to H. Rubin on Sept. 3, 1985, and the article by R. L. Martin entitled "Automation of Repair Service Bureau" in *2nd International Symposium On Subscriber Loop and Services*, May 3–7, 1976 at pages 39–43. With such Repair Service Bureaus (RSB), however, craft people in the field would contact a RSB person for information to correct a trouble report or to request tests to be run, and the requested information or test results would then be communicated by the RSB person back to the remote craft person via, for example, a telephone line.

Computer controlled test systems are also known such as the one disclosed in U.S. Pat. No. 4,402,055 issued to R. A. Lloyd et al. on Aug. 30, 1983. There, an automatic test system is controlled by a general purpose digital central processor which accepts programs specifying the test(s) to be performed. A plurality of interchangeable test devices, each including a programmable interface processor and a test instrument, are coupled to communicate with the central digital processor via a data bus such as an IEEE 488 General Purpose Interface Bus (GPIB). A switch matrix is also coupled to receive switching commands from the central processor to couple the input/output lines of the test instruments to the system to be tested. A broadband control network is also disclosed in the article "A Broadband Accelerator Control Network" by J. Skelly et al. in *IEEE Transactions On Nuclear Science*, Vol. NS-30, No. 4, Aug. 1983 at pages 2155–2157. As shown in FIG. 1 thereof, the network contains a dual coaxial cable linking all sites on the network, passive directional couplers, communication boxes (CB) which modulate baseband signals into the broadband network and provide handlers for a digital control channel (DCC), a GPIB bus linking a CB to a station on the control channel, and stations supporting the communications protocol on the DCC.

U.S. Pat. No. 4,680,788 issued to C. A. Cordeiro et al. discloses a microprocessor based control and switching device which allows a remote terminal to access, by modems, over a telephone line, a local system having a local Central processor unit (CPU) and a local console which connects to a switch assembly. A variety of firmware commands stored in the device, some of which may be applied by the local console or by a remote terminal, depending on which switch if depressed, provide a number of different operating modes, the modes including a conversation mode wherein the CPU is locked out and the local console and remote terminal can communicate directly with each other.

The problem remaining in the prior art is to provide a network such as a Craft Access System where many remote terminal devices at a customer location can communicate directly with a central database to obtain information and/or perform tests without interfacing with a central support bureau as, for example, a Repair Service Bureau and its personnel to have them access the central database and bidirectionally relay the information between the remote terminal devices and the database.

SUMMARY OF THE INVENTION

The foregoing problem in the prior art has been solved in accordance with the present invention which relates to a technique for interfacing a plurality of remote terminal devices, such as Craft Access Terminals (CATs), directly to an Operational Support System (OSS) database in, for example, a Craft Access System (CAS). More particularly, the present invention relates to an Applications Processor Microcomputer (APM) module which permits the remote terminal devices to directly access the OSS central database to obtain information and/or perform tests without interfacing with a Repair Service Bureau or its personnel unless so desired. Each APM can be selectively assigned with a predetermined number of separate remote terminal devices, and each APM has the capability to allow an associated remote terminal device that has called in to directly access the OSS database to received requested information from the OSS database. Additionally, the present APM is also arranged to provide an interchanging of high-speed data and control messages either with another APM of a plurality of such APMs forming a network of APMs via a standard IEEE 488 General Purpose Interface Bus (GPIB) or an APM assigned to control the scheduling of messages over the GPIB. This network of APMs permits the remote terminal devices selectively associated with each APM not able to be directly coupled to the OSS database to access the OSS database via the GPIB and the one or more APMs having direct access to the OSS database.

Preferably, when a plurality of APMs are connected to a GPIB, a "no listener" mechanism can be provided to manage the problem of a communication attempt with an APM that is not available to the GPIB. In such mechanism, a transmitting APM is notified that the destined APM is not available for the last high-speed data message transmission, thereby avoiding futile attempts to transmit messages to this non-existent APM until some indication is received that that a non-available APM is present.

Other and further aspects of the present invention will become apparent during the course of the following description and by reference to the accompanying drawings.

DETAILED DESCRIPTION

In accordance with a preferred embodiment, the present invention is described hereinafter in relation to a Craft Access System (CAS), but it should be understood that the concept can also be used in other database or communication systems. The advantages of the present invention are to provide a first module that can be interconnected (1) to one or more remote Craft Access Terminals (CATs), (2) to a database and an associated administrative computer of a CAS, and (3) to other corresponding modules via a standard IEEE 488 bus interface (GPIB) to enable the corresponding modules, and associated CATs, to directly access the database and administrative computer via the first module without interacting with a Service Repair Bureau or its personnel. Additionally, the modules are designed in accordance with the present invention to permit the GPIB to be used for passing both high-speed control and message signals between the modules as will be explained in greater detail hereinafter.

Figure 1:
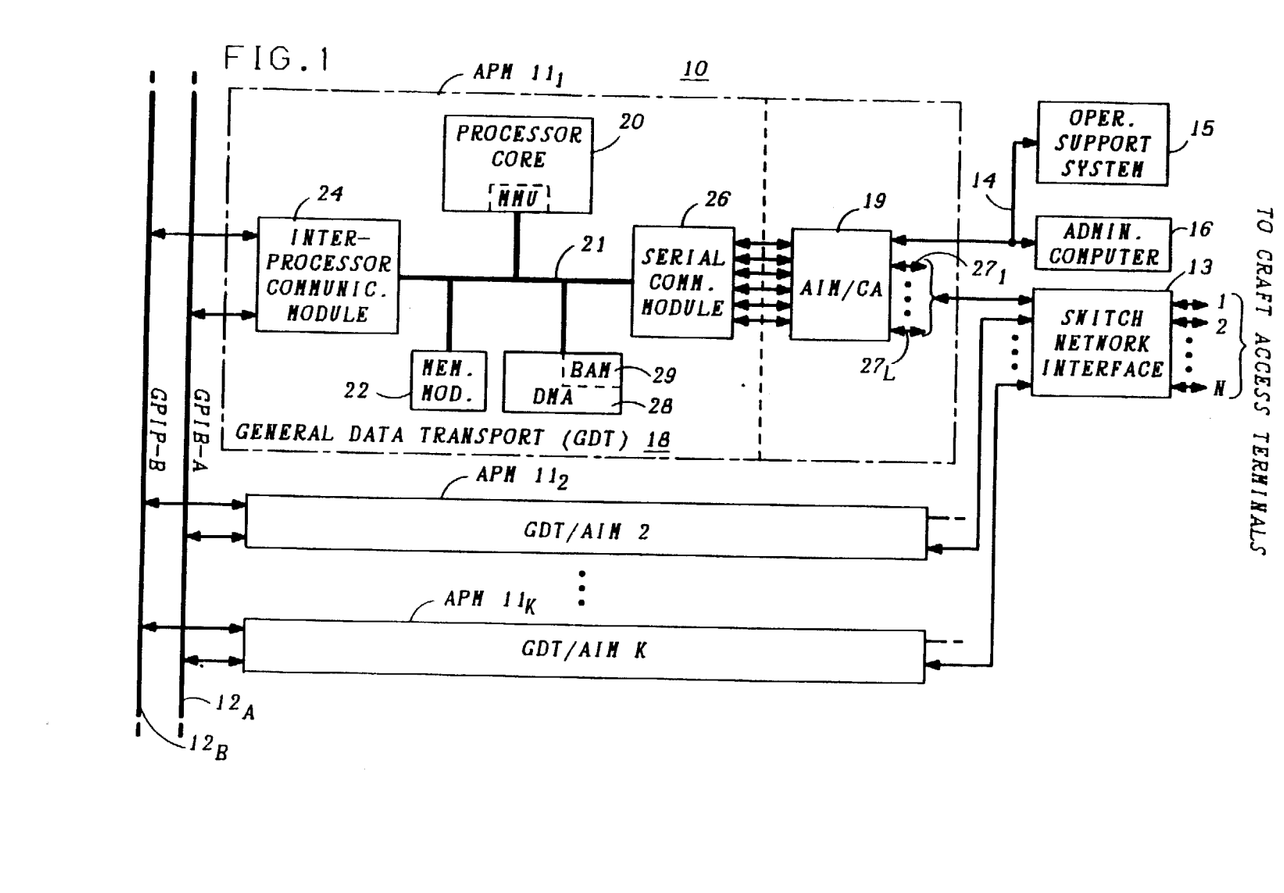
FIG. 1 is a block diagram of an Applications Processor Microcomputer (APM) module in the Craft Access System in accordance with the present invention.

FIG. 1 is a block diagram of a preferred arrangement of an Applications Processor Microcomputer (APM) module $11_1$, and the disposition of such APM in the exemplary (CAS) 10 in accordance with the present invention. FIG. 1 also shows that CAS 10 can be selectively expanded, in accordance with the present invention, by integrating more than one APM module 11 into CAS 10, e.g., a plurality of up to K APMs $11_1$ to $11_K$. When more than one APM 11 is integrated into CAS 10, the existing APMs are interconnected on a first side thereof by a first and a second General Purpose Interface Bus (GPIB) $12_A$ and $12_B$, respectively. The one or more APMs $11_1$ to $11_K$ are preferably also connected on a second side thereof to an optional Switch Network Interface (SNI) 13 to permit up to N Craft Access Terminals (CATs) to be interconnected to the one or more existing APMs, where N>K. As shown in FIG. 1, SNI 13 is connected to each of the existing APMs by a plurality of L seperate lines 27, e.g., L=5, and effectively functions as a call director that hunts for a free line to any one of the up to K existing APMs on the initiation of a call. It is to be understood that the CATs could alternatively gain access to a particular APM by directly dialing into that APM with number dedicated to one of the exemplary 5 input leads $27_i$. Additionally, at least one of the up to K existing APMs, e.g., APM $11_1$, is also connected on the second side thereof via a communication trunk 14 to, for example, (1) an Operation Support System (OSS) 15, such as the database of the Craft Access System (CAS) 10, and (2) an Adiministrative Computer 16 that stores and maintains the configuration and status of CAS 10. Administrative computer 16 preferably functions, for example, to provide system security by screening access by CATs to the system, and performing other system functions such as initializing programs in an APM 11 when that APM is powered up or restoring files in an APM when a CAT call is interrupted. More particularly, although an APM 11 operating system and the communication programs necessary to support downloading from Administrative Computer 16 are permanently stored in the APM, the other communication programs to provide complete communication application programs for APM 11 would not be permanently stored therein and would be downloaded into a memory module of the APM from Administrative computer 16. Additionally, when a call from a CAT being serviced by a APM 11 is accidentally disconnected or that line used for the call needs to be tested, and the call session has not been completed, the state of the session would be uploaded from the APM servicing the call and stored in Administrative Computer 16. When that call is again reinstated, continuation information for that call would be downloaded into the APM 11 continuing that call session.

Each existing APM, as shown in FIG. 1 for APM $11_1$, includes a first section designated as a General Data Transport (GDT) module 18, and a second section designated as an Applications Interface Module for Craft Access (AIM/CA) 19. GDT module 18 basically comprises a microcomputer processing means, which provides a powerful microprocessing environment, and multiple data communication interfaces. In the exemplary arrangement of GDT module 18 shown in FIG. 1, five major subsystems or modules form each GDT, namely, a processor core module 20, a memory module 22; and an interprocessor communications module 24, which combination forms a processor means, and a serial communications module 26, and a direct memory access module 28, which form the data communication interfaces.

Figure 2:
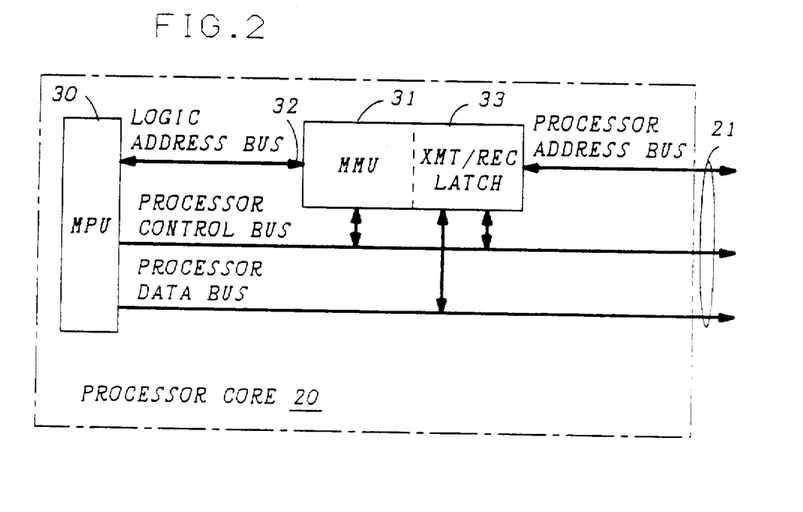
FIG. 2 is a block diagram of a portion of the processor core module in an APM of FIG. 1.

Processor Core 20 is the central module of each GDT 18 and provides the computational power and memory management that is required for applications processing and communication device control. The center of the Processor Core module is a microprocessor unit (MPU) 30, as shown in FIG. 2, such as a Motorola 68000 MPU or other MPU which preferably is compatible with the 68000 MPU. The description which follows is directed to the use of a MC68000 MPU, but it should be understood that such 68000 MPU, or compatible MPU, is not an absolute necessity and that a non-compatible 68000 MPU could be used but would require changes to be made in the other elements of APM 11 to achieve a corresponding overall result as described hereinafter. A detailed architectural and operation description of a model 68000 MPU can be found in the "MC68000 16-Bit Microprocessor Manual", from Motorola Semiconductors, dated April 1983. It is to be understood that to provide a multiprocessing environment for applications programming, hardware support for memory management is included in processor core 20. An exemplary Motorola MC68451 Memory Management Unit (MMU) 31 provides this hardware support and would reside on a logical address bus 32 of MPU 30. MMU 31 is detailed in the "68451 Memory Management Unit Manual", from Motorola Semiconductors, dated Apr. 1983. Therefore, the MPU and MMU combination can be viewed as a single unit that communicates with other modules via transceivers and latches in circuit 33 and a processor address control and data bus forming part of GDT bus 21 shown in FIG. 1. It is to be understood that other well-known discrete circuits are generally included in Processor Core 20 such as a system clock and timing circuit (not shown) to provide clock signals for system components. Additionally, since all data transfers among devices in an exemplary 68000 system are asynchronous, it is known that each peripheral device would be responsible for providing a Data Transfer ACKnowledge (DTACK) signal when it presents or receives data, and normally all 68000 compatible peripherals generate this signal internally. For non-68000 family devices, such as an EPROM and EEROM located in memory module 22 and GPIB controllers in ICM 24, a DTACK generation circuit should be provided. Another discrete device not shown for Processor Core 20 would be a Multi-Function Peripheral (MFP) such as the Motorola 68901 MFP which integrates four general purpose timers, eight single bit configurable Input/Output (I/O) ports, and a Universal Synchronous/Asynchronous Receiver/Transmitter (USART) for providing the serial command interface to AIM/CA 19. Two of the I/O ports would be configured as interrupt inputs for the two interprocessor bus controllers when these controllers are not 68000 compatible devices, and two additional I/O ports would be used as output signals to configure the interprocessor bus controllers. A detailed discussion of the internal architecture of the MFP can be found in "MK68901 Multi-Function Peripheral", from United Technologies Mostek, dated Dec. 1982.

Memory Module 22 provides a large and diverse memory resource for each APM 11, and, in the preferred embodiment, is a collection of three major memory types: (1) a Dynamic Random Access Memory (DRAM), (2) an Erasable Programmable Read Only Memory (EPROM), and (3) an Electrically Erasable Read Only Memory (EEROM) which are located on the physical address bus forming part of GDT bus 21 associated with processor core module 20. The DRAM is the major memory component for storing, for example, data changes that occur; the EPROM is used, for example, to store initialization routines and stable program codes; and the EEROM provides for some "real-time alterable" memory that will not be lost due to an interruption of power. This combination of volatile and non-volatile memory types provides a flexibility for (1) storage of information that will remain, and (2) storage of information that will need downloading during a power-down/power-up or disconnect/connect operation as discussed briefly hereinbefore.

Figure 3:
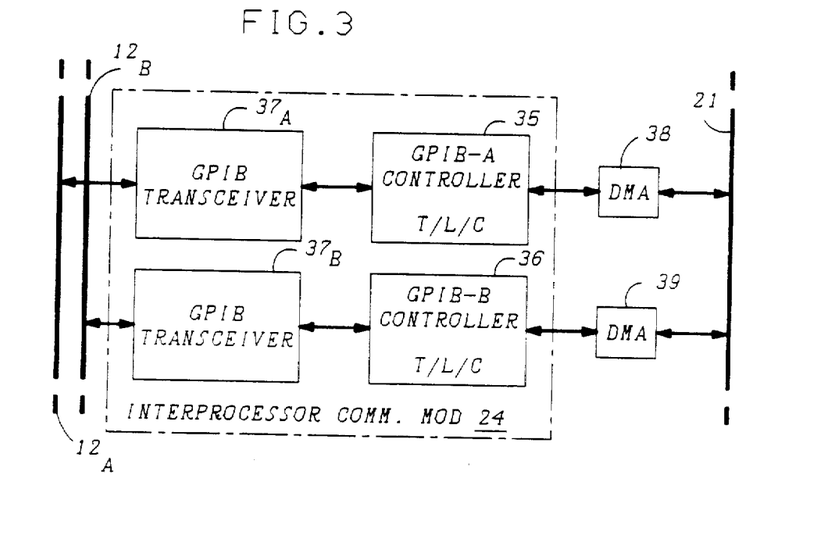
FIG. 3 is a block diagram of a general arrangement of an Interprocessor Communications Module (ICM) for use in an APM of FIG. 1.

An Interprocessor Communications Module (ICM) 24 provides the interconnection of the associated APM with the other existing APMs 11 using a dual high-speed bus $12_A$ and $12_B$ which is implemented, in accordance with the present invention, with a dual GPIB transport. In the prior art, the GPIB transport is commonly used and accepted only as a low-speed data transport. The present invention enhances the art by devising a technique which provides for both high-speed data and message transfer with each GPIB channel, and the channel is capable of, for example, a 0.5 megabyte transfer rate. The basic structure for the main portion of ICM 24 is shown in FIG. 3 and includes a first GPIB controller 35 and a second GPIB controller 36 for accessing the GPIB-A and GPIB-B buses $12_A$ and $12_B$, respectively, via GPIB transceivers $37_A$ and $37_B$. The GPIB controllers 35 and 36 provide the Talker/Listener/Controller (T/L/C) functions, as defined by the program implementing the Craft Access Operating System, for accessing the associated GPIB buses. ICM 24 can be implemented, for example, with a Texas Instrument (TI) 9914A T/L/C circuit chip for GPIB controllers 35 and 36 along with TI transceivers $37_A$ and $37_B$ for a GPIB interface. Since a GPIB T/L/C circuit 35 and 36 is generally not a MC68000 compatible device, GPIB interrupts will be processed by the MFP forming part of Processor Core module 20, described hereinbefore. A DTACK signal supplied by the DTACK generation circuitry of the Processor Core module 20 is required for the GPIB peripherals. Due to the high bandwidth of GPIBs $12_A$ and $12_B$, a dedicated DMA channel is allocated to each GPIB controller 35 and 36 via a separate DMA controller 38 and 39, respectively. It is to be understood that the blocks for DMA controllers 38 and 39 each include one DMA controller. Each DMA controller is used for transmission and reception between ICM 24 and GDT bus 21. GPIB Transceivers $37_A$ and $37_B$ may comprise MC75160 and MC75162 Bus transceivers. Each of the GPIBs $12_A$ and $12_B$ is a commonly known IEEE 488 bus which includes separate leads that are used, in the present CAS 10, for transmission of (1) data such as messages, and (2) control signals such as (a) requests for service, and (b) the address to Talk or Listen or a Remote Enable signal.

Figure 4:
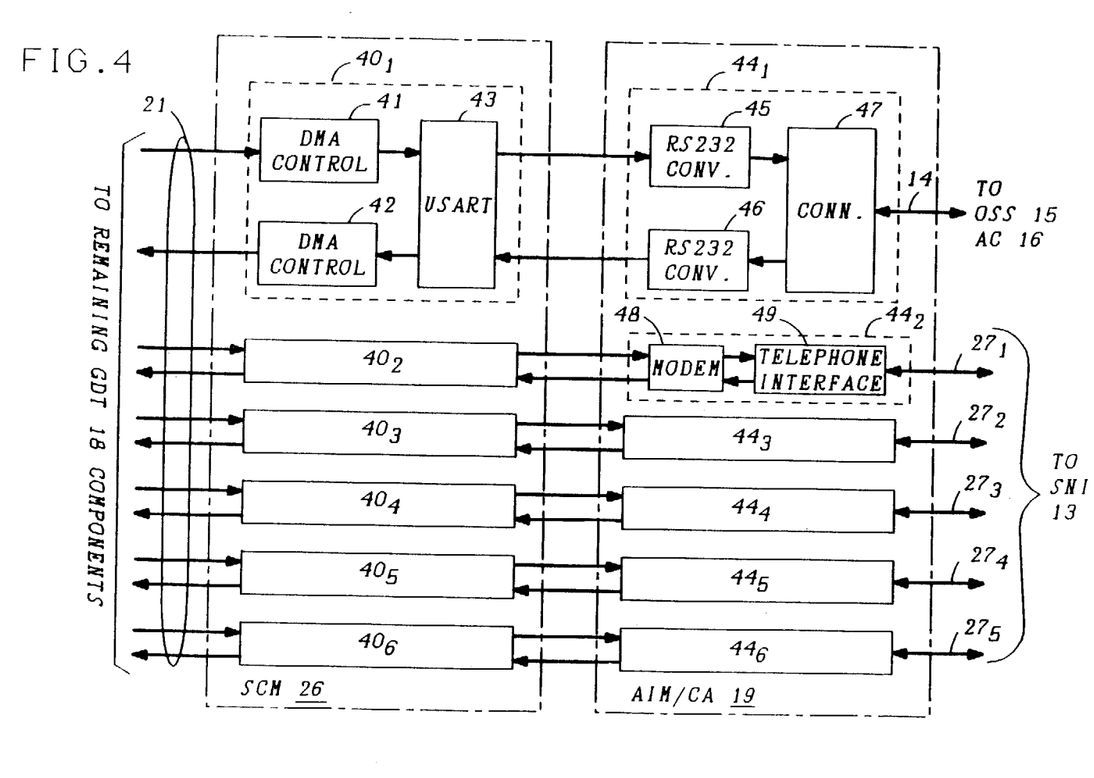
FIG. 4 is a block diagram of a Serial Communications Module (SCM) and an Applications Interface Module for Craft Access (AIM/CA) for use in an APM of FIG. 1.

A Serial Communications Module (SCM) 26 provides a plurality of, for example, six serial data interfaces between itself and AIM/CA 19. The exemplary six data interface SCM 26 can be implemented using, for example, three dual channel Motorola 68564 Serial I/O controllers (SIOs) to provide six programmable communication interfaces which are depicted in FIG. 4 by 6 data ports $40_1$ to $40_6$. For example, data port $40_1$ is configured to operate at 9600 baud synchronous, and data ports $40_2$–$40_6$ are configured to operate at 1200 baud asynchronous. To accommodate this exemplary range of data transmission rates, interrupt or DMA support can be allocated on a port-by-port basis. More particularly, as shown in FIG. 4, each data port $40_1$ to $40_6$, for the exemplary six port SCM 26, has two dedicated DMA channels for interfacing with GDT bus 21, one for data transmission and one for data reception requiring two DMA controllers 41 and 42 which terminate in a Universal Synchronous/Asynchronous Receiver/Transmitter 43 (USART). It is to be understood that USART 43 can be a shift register, to permit the transmission or reception on any of the exemplary six channels to and from AIM/CA 19. Full duplex communication can, therefore, be supported. If transmission rates do not require DMA support, the interrupt servicing can be selected. Data, clock and interface control leads are provided by the SIOs and make up the interface signals that are transmitted to AIM/CA 19.

The Direct Memory Access (DMA) module 28 provides a high bandwidth data transfer resource that can be used as required. To support high-speed I/O applications, an efficient method of transferring data throughout each APM 11 is needed, which function is provided by the associated DMA hardware. For example, the DMA controllers 38 and 39 in FIG. 3 provide dedicated DMA channels for the GPIB devices used to implement interprocessor communications via buses $12_A$ and $12_B$. Additionally, dedicated DMA channels are also provided for the six serial communications interfaces described hereinbefore for SCM 26. A total of 14 DMA controllers would, therefore, be required in the exemplary system to support the exemplary two interprocessor channels and the exemplary six serial communications channels. Using a Hitachi 68450 four channel DMA controller, four such devices would be required. Each device should be able to request, and be granted, bus mastership of the system. When the DMA controller is owner of the bus, it can transfer data between its associated peripheral and memory module 22. To arbitrate among the request of the plurality of DMA controllers, an MC68452 Bus Arbitration Module (BAM) 29 can be used to implement a fixed priority arbitration scheme. For example, the highest priority can be used for communication trunk 14. Additionally, (1) interrupt arbitration should preferably be provided, (2) transparent latches and data bus transceivers, like circuits 33 of FIG. 2, would be required to interface the DMA controllers to the 68000 MPU bus structure, and (3) an eight to three line encoder should preferably also be provided to process state information to the DMA controllers. A complete description of the components used in the DMA module 28 can be found in the Manual "HD68450 Direct Memory Access Controller", from Hitachi Ltd., dated Feb. 1984, and "MC68452 Bus Arbitration Module", from Motorola Semiconductors, dated Aug. 1982.

AIM/CA 19 is a microcontroller that provides switched-network data ports for Craft Access Terminals and a trunk interface for communications networking to OSS 15 and Administrative Computer 16, and basically arranges GDT 18 for access to Craft Access System 10. For the exemplary arrangement discussed hereinbefore, AIM/CA 19 takes six channels of serial data and associated control signals from SCM 26 and generates, for example, five 300/1200 baud switched-network data interfaces for connection to SNI 13, and a single EIA RS232C compatible DTE interfaces for connection to communication trunk 14. FIG. 4 also provides a block diagram of the exemplary AIM/CA 19 showing six channel ports $44_1$ to $44_6$, each channel port $44_i$ being coupled to a corresponding channel port $40_i$ in SCM 26. More particularly, channel port $44_1$ includes (1) a separate RS232 signal converter 45 and 46 for each direction of transmission between itself and the corresponding channel port $40_1$ on SCM 26, and (2) a connector 47 associated with communication trunk 14. Channel ports $44_2$–$44_6$ each include a modem 48 coupled to corresponding channel ports $40_2$–$40_6$ and a telephone interface 49 which implements a 2-wire to 4-wire conversion, and vice versa.

Figure 5:
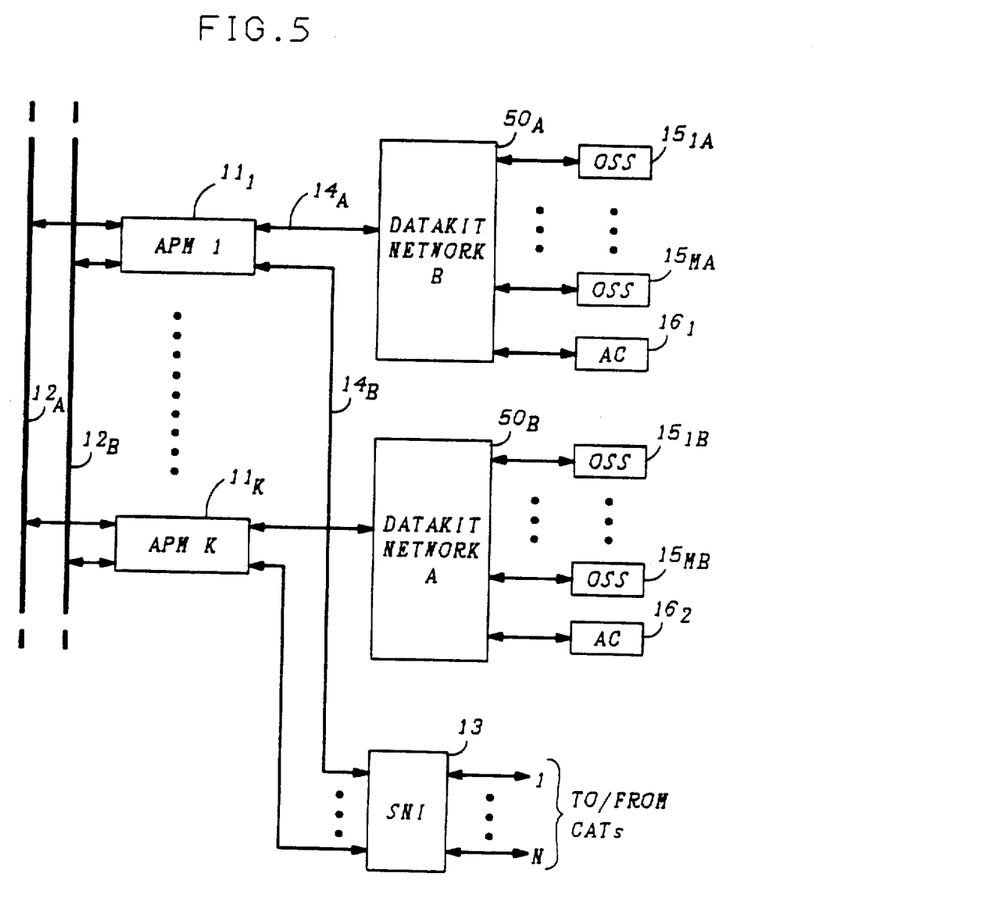
FIG. 5 is a block diagram of the network of FIG. 1 connected to more than one Datakit Network and associated Operation Support Systems and Administrative Computers.

It is to be understood that trunk 14 can comprise any suitable form such as a trunk used with, for example, a Datakit TM network, and that there may be more than one OSS 15 coupled to that Datakit network, along with the associated Administrative Computer 16, to which an APM $11_i$ can gain access to. Additionally, if more than one APM 11 is arranged to be coupled by a separate trunk 14 to a Datakit network, including one or more OSS 15 and an Administrative Computer 16, then all such APMs 11 can gain access to the same Datakit network and the appropriate OSS 15 and the Administrative Computer 16 connected thereto. Alternatively, as shown in FIG. 5, each such arranged APM 11, as for example APM $11_1$ and $11_K$, can each be coupled via the associated trunk $14_A$ and $14_B$, respectively, to a respective different Datakit network $50_A$ and $50_B$ which each have one or more OSS 15 and an Administrative Computer 16 coupled thereto. Having gained access to the associated network $50_A$ or $50_B$, APM $11_1$ or $11_K$ can, in turn, access the separate one or more OSS $15_{1A}$ to $15_{MA}$ or $15_{1B}$ to $15_{MB}$, respectively, and respective Administrative computer $16_A$ and $16_B$ associated with networks $50_A$ and $50_B$, respectively. It is to be further understood that each of the corresponding OSS 15s for networks $50_A$ and $50_B$ in FIG. 5 may comprise the same OSS which is connected to both Datakit networks and, therefore, accessible by both APMs $11_1$ and $11_K$.

Craft Access Terminals are not shown but basically comprise, for example, hand-held terminals which are bridged onto a telephone line by, for example, clips and used to transmit or receive data and/or voice signals. In this regard see, for example, U.S. Pat. No. 4,005,388 issued to R. E. Morley et al. on Jan. 25, 1977, or design patent DES 295,411 issued to G. Cho et al. on Apr. 26, 1988.

GPIB $12_A$ or $12_B$ in the prior art were only designed to access instruments and not to pass messages between circuit boards such as APMs $11_1$ to $11_K$. The present invention not only allows each APM to be arranged to directly have a message from an associated CAT access an OSS 15 in an exemplary Craft Access System, but provides a novel high data rate message and control transfer ability between multiple APMs 11 so that these APMs, and their associated CATs, can also directly access the OSS 15 via the APM having the ability to be directly coupled to the OSS when not all APMs are not so able.

The software to permit such operation is hereinafter designated as the Craft Access Operation System (CAOS) which could, for example, be stored in the permanent memory of Memory Module 22 to support message transfer over GPIBs 12 between the APMs 11 of CAS 10. For purposes of definition hereinafter, it will be assumed that the "GPIB Driver" program is that part of the software that controls the GPIB controllers 35 and 36 in the associated ICM 24. The T/L/C function for GPIB controllers 35 and 36 is located in the GPIB Driver program and is included normally in part of the non-volatile memory of Memory Module 22. Additionally, hereinafter the term "General Processor Transport Assurance (GPTA)" will refer to the program that receives messages from the applications. These messages are placed in a queue designated for a particular use, e.g., to send control or information messages over a particular one of GPIBs 12. As will be described hereinafter, the present arrangement introduces a level of intelligence and dynamic message routing and passing which is not found in the prior art.

Figure 6:
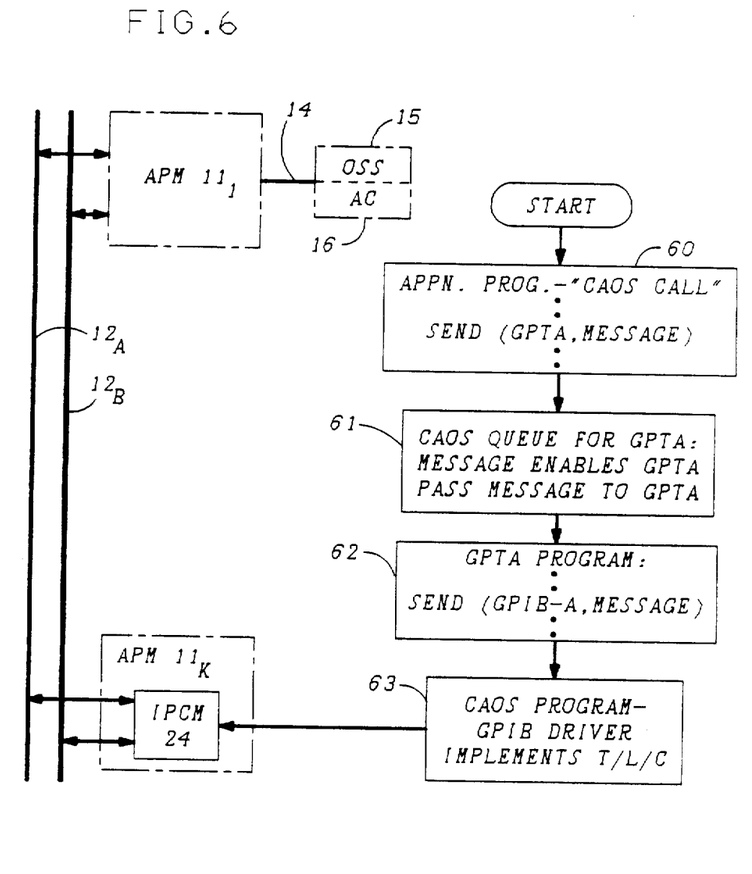
FIG. 6 is a block diagram of an exemplary network according to FIG. 1 showing a partial flow diagram for processing message traffic between APMs.

For purposes of discussion hereinafter of the operation of CAS 10, it will be assumed that CAS 10 only includes two APMs; namely APM $11_1$, and $11_K$ shown in FIG. 1. When a Craft Access Terminal initiates a call to CAS 10, the call is routed by SNI 13 to a free line on one of the existing APMs 11, e.g., APM $11_K$. APM $11_K$ enters its applications program for initiating the Call. More specifically, Processor Core 20 in APM $11_K$ enters an application program shown in block 60 to place a "Send" order at the end of a CAOS program "GPTA Message" queue as shown in FIG. 6. When the CAOS program accesses the CAOS GPTA Message Queue, as shown in block 61, CAOS will find the "Send" message indicating that a CAT wishes to access CAS 10, and CAOS enables the GPTA program. The GPTA program responds by assembling the appropriate "send" message with (1) the appropriate address of a selected one of GPIB $12_A$ or $12_B$ (e.g., GPIB $12_A$) and (2) the control or information message to be sent, and then places that "send" message in a GPIB Driver Transmit Queue as shown in block 62. When the CAOS program enters the GPIB Driver Transmit Queue, as shown in block 63, CAOS causes IPC 24 to access GPIB $12_A$ and send the message stored in the queue over a designated GPIB, e.g., GPIB-A $12_A$ to APM $11_1$. More particularly, IPC 24 in APM $11_K$ first gains access to GPIB $12_A$ and then makes a "Request For Service" with the "Address of the Listener" (APM $11_1$) over the "Control" section of GPIB $12_A$. The GPIB controller 35 of APM $11_1$ polls the Request for Service from APM $11_K$ and enqueues it with other such requests. When the Request for Service from APM $11_K$ is scheduled by GPIB controller 35 of APM $11_1$, the listening function of APM $11_1$ is enabled. The talking function of IPC 24 of APM $11_K$ is enabled by the GPIB controller 35 of APM $11_1$. Then the GPIB controller 35 of APM $11_1$ releases control of GPIB $12_A$, allowing APM $11_K$ to send its message to APM $11_1$ over GPIB $12_A$. When APM $11_1$ receives the information from APM $11_K$ it routes the information via trunk 14 to OSS 15 or AC 16. OSS 15 or AC 16, in turn, send an appropriate response message back to that CAT via APM $11_1$, GPIB $12_A$ or $12_B$, and APM $11_K$ in a similar manner using the GPTA and CAOS programs in APM $11_1$. The APMs 11 communicate with each other in the manner explained above and each "Talker" (or APM making a transmission)) makes a separate request to use the GPIB $12_A$ or $12_B$. The Data section of each GPIB $12_A$ or $12_B$ is used to pass the messages between the APMs while the Control section of each GPIB is used to send either (1) requests for service or (2) either the address to talk/listen or a remote enable signal.

In accordance with the present invention, CAS 10 need not include all of the possible plurality of K APMs $11_1$ to $11_K$ but can be expanded from one APM to all K of the APMs in stages. Administrative Computer 16 keeps track of what equipment exists in CAS 10. GPIB controllers 35 or 36 in each APM 11 controls the transmissions between APMs. The CAOS GPIB Driver program supervises communications and submission of listener addresses of other APMs for both talker/listener and master APM functions. When a listener APM is addressed by the master APM, the GPIB driver program prepares the listener APM for the message. Two outcomes are possible at the listener APM: (1) the GPIB driver program does not have a buffer for the message, and in this case, the listener APM does not provide an acknowledgment to the master APM; and (2) a buffer is available and the master APM is acknowledged. If the master APM receives an acknowledgment from the listener APM, the talker APM is then addressed, and the master APM releases control of the GPIB, thereby permitting the message to be sent. The talker APM uses the control portion of GPIB 12 to signal the end of the conversation to the listener APM and the master APM. A timer is used by the master APM to detect a bus message transfer that does not complete in a timely manner, and the master APM again takes control of the bus to schedule the next message transfer. The occurrence of the time out is passed by the GPIB driver programs at the talker and listener APMs to their corresponding GPTA programs. From there, it is returned to the application programs which, in turn, sends an indication to the Administrative Computer 16. Complete messages are also directed to the destination application program in a similar manner. When the master APM does not receive an acknowledgment from the APM addressed to listen, it informs the "Talker" APM that there is "No Listener" and that the "Talker" APM has a message that cannot be sent. The Talker APM then transmits this information back to its applications program that there is an error because the intended "Listener" APM is not available.

In the operation of the GPIBs, CAOS channels available to application tasks of the network of APMs 11 will be initialized at the time the network is started when CAOS is initialized. The initialization can take the form of providing a standard assignment to the APMs on a GPIB by assigning the master APM status for GPIB $12_A$ to, for example, APM $11_1$ and the master APM status for GPIB $12_B$ to, for example, APM $11_2$. If either one of these APMs is not equipped, then requests for the corresponding bus would not be serviced by the GPIB driver program and the assignment should be revised. The initialization might include the enabling of appropriate interrupts and masks to be used with the GPIB controllers 35 or 36 for both talker, listener and master APM functions. If the APM $11_i$ is in a master APM position, a maintenance message might be provided to inform the GPTA program in the APM that the MPU on this host APM must also perform the master APM functions for the associated GPIB. After the master APM is initiated, it will clear the associated GPIB and then check to see if any requests for service have been made.

More particularly, as shown in FIG. 6, when an application task program has to make a transmission it forms a CAOS "Send" message formatted for the data message. The GPIB driver program will read a message header in the "Send" call message format in order to determine which connection should be established. The data message to be sent is placed at the end of a transmit buffer queue. A request for service is then made to the master APM for use of the associated GPIB, with the stored message including the address of the listener, or destination, APM. The master APM will detect such request for service and conduct a poll sequence to determine which APMs are requesting service. These requests are added to a service request queue maintained by the master APM. The master APM will then schedule requests from the queue until it is empty. At that time the master APM will again check for pending requests and repeat the polling and scheduling process.

In order to schedule the transmission of a data message between APMs, a master APM can take the following steps. If the master APM is not either a scheduled talker (transmitting) APM or listener (receiving) APM, it will address the listener APM to listen, and the talker APM to talk. The master APM will then enter a standby state effectively freeing the GPIB to permit the talker APM to start sending the data message over the GPIB 12. If the master APM is to take part on the message transmission, it will address itself as a talker or listener APM. The end of a current message transmission will be detected by both the listener APM and the master APM using the control portion of GPIB 12. The listener APM will then attach the data message to a channel receive queue and the master APM will take control of the GPIB 12. If a master APM fails, the inclusion of two or more GPIBs $12_A$ and $12_B$ in a network permits messages scheduled by the failed controller for the associated GPIB 12 to be switched to another master APM and its associated GPIB.

It is to be understood that the above described operational feature are exemplary in nature and that any other suitable operation sequence could be substituted therefor which permits the plurality of APMs 11 to transmit and receive high-speed data message and control signals between pairs of APMs over the one or more GPIBs 12. Similarly an APM can include a "maintenance message" arrangement by which the GPTA program can obtain status information from the master APM. These maintenance messages can be used to inquire about the state of the GPIB 12 and the status of previous send requests. Such maintenance messages can also be used to de-queue messages from a "send" queue and to notify an APM of an error condition on the GPIB.

What is claimed is:

1. An Applications Processor Microprocessor (APM) module comprising:
   an Applications Interface Module (AIM) including (a) a first input-output (I/O) terminal for interchanging first data and control messages with a first remote device, (b) at least one second I/O terminal, each at least one second I/O terminal being connected to a second remote device at any instant of time for interchanging second data and control messages with the second remote device, and (c) at least two third I/O terminals; said third I/O terminals being coupled to said second I/O terminal through a modem and a telephone interface and to said first I/O terminal through a signal converter, and
   a General Data Transport (GDT) module including
     (a) at least two first I/O terminals each coupled to a corresponding one of the at least two third I/O terminals of the AIM,
     (b) at least two second I/O terminals each being connected to a separate one of at least two standard General Purpose Interface Buses (GPIBs) coupled to pass data and control messages, and
     (c) processor means comprising a processor core module coupled to a memory module, said processor means coupled to both the at least two first and second I/O terminals of the GDT for (i) receiving a second data and control message service request from the at least one second I/O terminal of the AIM via the at least two third I/O terminals of the AIM and the at least two first I/O terminals of the GDT, (ii) generating a format and one or more third data and control messages required to produce a response to the received second data and control message service request, and transmitting said one or more third data and control messages either via (1) the at least two first I/O terminals of the GDT to the at least two third I/O terminals of the AIM and then to either (a) the first I/O terminals of the AIM as said first data and control message to obtain a responsive fourth data and control message from said first remote device, or (b) the at least one second I/O terminal of the AIM when said third data and control message is a requested response to initially received second data and control message service request, or (2) via one of the at least two second I/O terminals of the GDT to obtain said responsive fourth data and control message, and (iii) in response to said received fourth data and control message generating and transmitting further third data and control messages to the at least two first or second I/O terminals of the GDT until an requested response is derived for the second data and control message service request initially received from the at least two first I/O terminals of the GDT via the at least one second I/O terminal of the AIM, and sending said requested response to the at least one second I/O terminal of the AIM via the at least two first I/O terminals of the GDT and the at least two third I/O terminals of the AIM.

2. The APM according to claim 1 wherein the GDT further comprises:
   an Interprocessor Communications Module (IPC) disposed between the processor means and the at least two second I/O terminals of the GDT, the IPC comprising a separate GPIB controller for each of the at least two second I/O terminals of the GDT for transferring said third data and control messages between the processor means and a selective one of the at least two second I/O terminals of the GDT by determining which of the at least two GPIBs connected to the at least two second I/O terminals of the GDT is available for receiving and propagating the third data and control message and selecting that associated one of the at least two second I/O terminals of the GDT.

3. The APM according to claim 1 or 2 wherein the GDT further comprises:
   a Serial Communications module (SCM) including separate means disposed between said processor means and each of the at least two first I/O terminals of the GDT for bidirectionally converting first to fourth data and control messages transmitted or received in parallel by the processor means, and associated with one of the at least two first I/O terminals of the GDT, into compatible corresponding serial first to fourth data and control messages, respectively, which are selectively transmitted or received at the associated one of the at least two first I/O terminal of the GDT.

4. The APM according to claim 3 wherein the AIM includes first interface means coupled to a first one of the at least two third I/O terminals of the AIM and the first I/O terminal of the AIM for bidirectionally converting serial data and control messages between a predetermined format at the first one of the at least two third I/O terminals of the AIM and an RS232 compatible interface signal at the first I/O terminal of the AIM to provide an interface for a communication trunk; and
   second interface means coupled to a second one or more of the at least two third I/O terminals of the AIM and the at least one second I/O terminal of the AIM for bidirectionally converting a predetermined format of said serial data and control messages at said second one of the at least two third I/O terminals of the AIM into a predetermined baud rate switched network data signal at the at least one second I/O terminal of the AIM.

5. The APM according to claim 2 wherein each of the IPC GPIB controllers includes means for transmitting a predetermined third data and control message to the at least two second I/O terminals of the GDT for transmission to a destination device and then waiting for a fourth data and control message indication received at an associated at least second I/O terminal of the GDT from a master device also coupled to an at least second I/O terminal via a GPIB indicating that either the third data and control message may be sent, or that a destination device is not available for receiving the third data and control message, the transmitting and waiting means then notifying the processor means that the destination device is not available for receiving the third data and control message, whereby the processor means responds to said transmitting and waiting means with the fourth control and data message indicating whether such destination device exists or not.

* * * * *